(12) United States Patent
Maruyama

(10) Patent No.: US 9,041,962 B2
(45) Date of Patent: May 26, 2015

(54) IMAGING FORMING APPARATUS, IMAGE FORMING SYSTEM, AND PROGRAM THAT ENABLES DATA TO BE EDITED AND PROCESSED

(71) Applicant: Oki Data Corporation, Tokyo (JP)

(72) Inventor: Sumito Maruyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/928,523

(22) Filed: Jun. 27, 2013

(65) Prior Publication Data

US 2014/0002858 A1 Jan. 2, 2014

(30) Foreign Application Priority Data

Jun. 27, 2012 (JP) .................................. 2012-143985

(51) Int. Cl.
*G06F 3/12* (2006.01)
*H04N 1/387* (2006.01)

(52) U.S. Cl.
CPC ............ *G06F 3/1208* (2013.01); *G06F 3/1213* (2013.01); *G06F 3/1247* (2013.01); *G06F 3/1256* (2013.01); *G06F 3/1267* (2013.01); *G06F 3/1292* (2013.01); *H04N 1/387* (2013.01)

(58) Field of Classification Search
USPC .................................................. 358/1.1–3.29
See application file for complete search history.

(56) References Cited

U.S. PATENT DOCUMENTS

| | | | |
|---|---|---|---|
| 2009/0268003 A1* | 10/2009 | Lapstun et al. | ................ 347/109 |
| 2011/0026042 A1* | 2/2011 | Cogan et al. | .................... 358/1.2 |
| 2012/0299843 A1* | 11/2012 | Kim | ................ 345/173 |
| 2013/0155464 A1* | 6/2013 | Bearchell | ..................... 358/1.15 |

FOREIGN PATENT DOCUMENTS

JP 2008-084183 A 4/2008

\* cited by examiner

*Primary Examiner* — Marcellus Augustin
(74) *Attorney, Agent, or Firm* — Muncy, Geissler, Olds & Lowe, P.C.

(57) ABSTRACT

An image forming apparatus includes a data converting module, a communicating unit, a differential data obtaining module, and a combining module. The data converting module is configured to convert image data to displayed image data. The communicating unit is configured to send via a network the displayed image, and to receive an edited displayed image via the network which is edited based on the displayed image. The differential data obtaining module is configured to obtain differential data of at least a difference between the image data and the edited image data. The combining module is configured to combine the image data with the differential data into combined image data.

18 Claims, 19 Drawing Sheets

| DEVICE INFORMATION | |
|---|---|
| DEVICE NAME | 50 : MOBILE DEVICE |
| VERTICAL PIXELS (pixel) | 480 |
| HORIZONTAL PIXELS (pixel) | 320 |
| COLOR RESOLUTION (bit) | 12 |
| FORMAT TYPE | TIFF |

80

IMAGING FORMING APPARATUS, IMAGE FORMING SYSTEM, AND PROGRAM THAT ENABLES DATA TO BE EDITED AND PROCESSED

CROSS-REFERENCE TO RELATED APPLICATION

This application claims priority under 35 U.S.C. §119 from Japanese Patent Application No. P 2012-143985, filed on Jun. 27, 2012, the disclosure of which is incorporated herein by reference.

BACKGROUND

1. Technical Field

This application relates to an image forming apparatus that enables image data to be edited and processed, and an image forming system including the image forming apparatus.

2. Description of Related Art

A conventional image forming system enables an image to be printed at a printer that functions as an image forming apparatus and a multifunction peripheral (MFP) based on a print command received via a network from, for example, a personal computer (PC), a personal digital assistant (PDA), a cell phone, or a multi-functional cell phone (smart-phone).

Japanese patent publication 2008-84183 describes an image forming system that communicates with a mobile device such as a cell phone, and that can change a print setting and print based on commands received from the mobile device.

However, in the image forming apparatus and the image forming system, it is not possible to edit and correct documents from the mobile device prior to printing, thereby limiting user convenience of such a system.

SUMMARY

In view of the above, an image forming apparatus is disclosed that is capable of efficient document editing and of improving user convenience.

In particular, an image forming apparatus includes a data converting module, a communicating unit, a differential data obtaining module, and a combining module. The data converting module may be configured to convert image data to displayed image data. The communicating unit may be configured to send displayed image via a network, and to receive an edited displayed image via the network that is edited based on the displayed image. The differential data obtaining module may be configured to obtain differential data that has at least a difference between the image data and the edited image data. The combining module may be configured to combine the image data with the differential data into combined image data.

After editing the displayed image data, the differential data obtaining module may obtain a differential data, and the combined image data is combined the image data with the differential data. In this way, the image forming apparatus may edit efficiently and improve the convenience for users.

DETAILED DESCRIPTION

Figure 1:
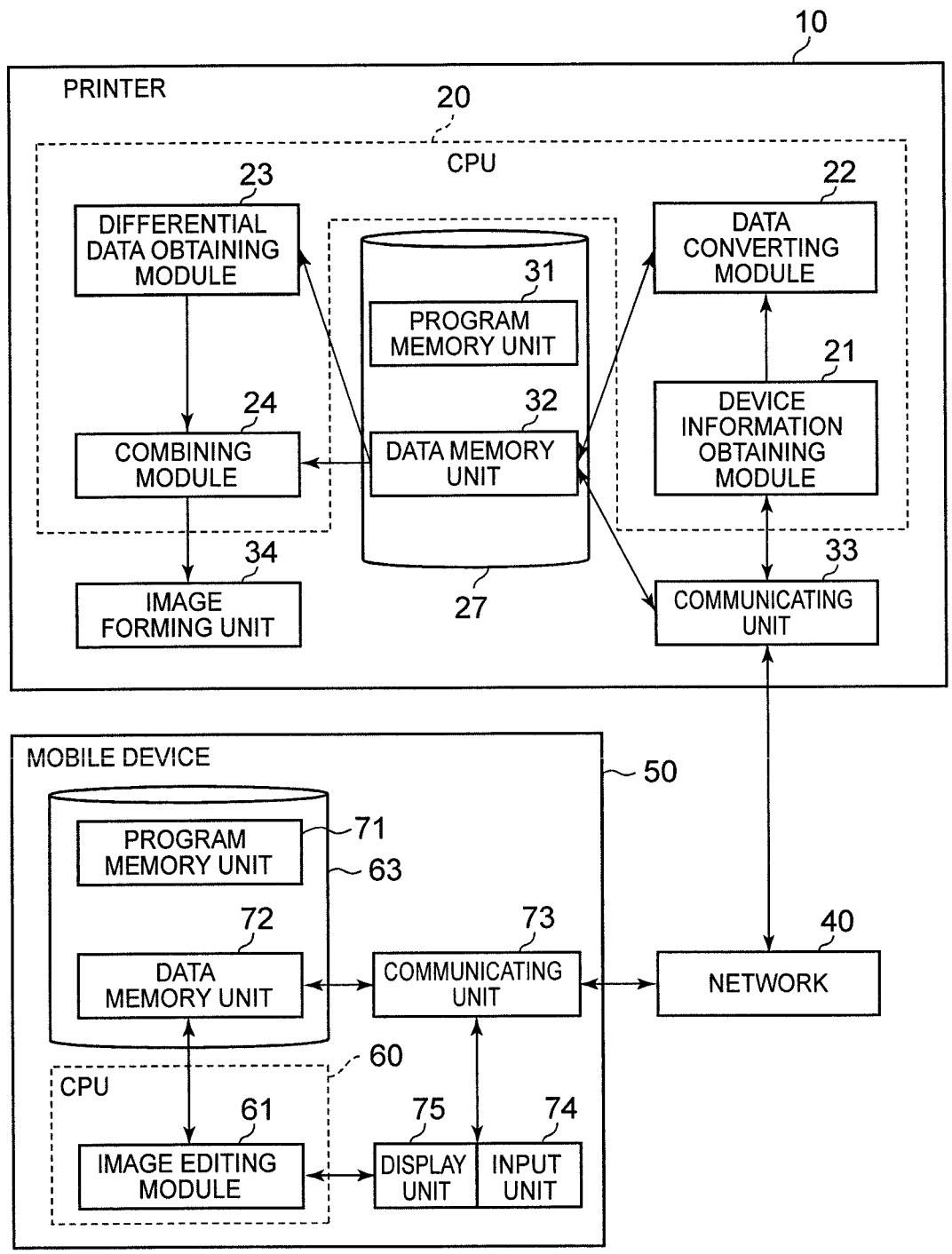
FIG. 1 is a schematic block diagram showing the composition of an image forming system according to a first illustrative embodiment.

Embodiments of the image forming system will be described with reference to FIGS. 1 to 24 of the drawings, in which like elements are indicated by like reference characters. In the drawings, configurations, positional relations, dimensions, and alignments of elements of the device are illustrated generally for understanding the embodiments and are only intended to facilitate understanding. Described materials and numerical values are merely exemplary. In the drawings, common elements of structures may be designated by the same reference characters, and an explanation thereof is occasionally omitted. Accordingly, embodiments are in no way limited to those illustrated.

Configuration of the Image Forming System in the First Embodiment

The configuration of a first embodiment of the image forming system is shown FIG. 1. The image forming system in FIG. 1 may include a printer 10 and one or more mobile device(s) 50 such as, for example, a PDA (Personal Digital Assistant), a cell phone or a smart phone, as an external device. The printer 10 and the mobile device(s) 50 are connected via a network 40.

The printer 10 may include a CPU (Central Processing Unit) 20, a storage unit 27, a communicating unit 33, and an image forming unit 34. The CPU 20 controls units and modules in the printer 10. The storage unit 27 stores, for example, computer program(s), as well as related or other information. The computer program(s) may include a control program to control the printer 10. For example, in embodiments where modules 21-24 are implemented as computer programs, the storage unit 27 may store the modules 21-24 and data used by the modules 21-24. The storage unit 27 may be configured using a hard disk (HDD), a Read Only Memory (ROM), a Random Access Memory (RAM) or an Erasable Programmable Read Only Memory (EEPROM). In other words, any of the operations or functions discussed herein may be implemented on Non-Transitory Computer-Readable Media. The storage unit 27 may include a program memory unit 31 and a data memory unit 32. The program memory unit 31 stores control programs, and the data memory unit 32 stores one or more document(s) including image data and working data that might be generated in an image forming process. The communicating unit 33 has functional sending and/or receiving data. The image forming unit 34 may form and output an image by, for example, printing the image on paper after forming the image.

Other implementations are possible, such as pure hardware implementations (e.g., specialized or application specific integrated circuits configured with logic to perform particular operations), or combinations of hardware and software and/or firmware.

On the other hand, in embodiments where one or more of the modules 21-24, or parts thereof, is/are or include(s) a separate hardware device(s) such as an integrated circuit(s) configured with logic to perform operations of corresponding modules 21-24, the storage unit 27 may be internal to one or more of the units 31-32, or may be external to one or more of the units 31-32, and accessed to perform the various operations of the modules 21-24. The modules 21-24 may operate under the control of the CPU 20.

The color resolution of image data in the data memory unit 32 may be a 24 bit RGB. Each of components (Red, Green, and Blue) of the RGB is 8 bits (256 tones). The resolution of the printer 10 and the image data may be 600 dpi (dots per inch).

The CPU 20 may execute control programs stored in the program memory unit 31, and oversee functions of the printer 10. For example, the CPU 20 may include the device information obtaining module 21, the data converting module 22, the differential data obtaining module 23, and the combining module 24.

The device information obtaining module 21 may obtain device information 80 (FIG. 2) of the mobile device(s) 50 via the communicating unit 33 and network 40. The device information is the information that includes the size and type(s) of the displayed image that the mobile device 50 may process. The device information 80 may include horizontal pixels, vertical pixels, color resolution, and a format type of image. The format type of image may be selected so as to be processed by the mobile device 50. For example, the vertical pixels and horizontal pixels may be 480 and 320, the color resolution may be 12 bits, and the type of displayed image may be TIFF (Tagged Image File Format). The type(s) may be, for example, TIFF, PNG (Portable Network Graphics), and/or JPEG (Joint Photographic Experts Group).

After the data converting module 22 refers to the device information 80 in the device information obtaining module 21, the data converting module 22 may convert the image data based upon the information included the device information 80. The converted image data is stored in the data memory unit 32. The differential data obtaining module 23 finds the difference(s) among more than two sets of image data in the data memory unit 32 and obtains differential data. For example, the differential data obtaining module 23 finds the difference between the image data and edited image data, and the differential data obtaining module 23 obtains the differential data. The differential data obtaining module 23 may generate the differential data, or may obtain the differential data that is externally generated at, for example, the mobile device 50. The type(s) of image data may be RGB, and the type(s) of the differential data may be RGBA (Red, Green, Blue, Alpha). The differential data obtaining module 23 may obtain the difference for each pixel. When there is no difference in terms of RGB image data, the value of Alpha value is set to "0," which indicates that the image is totally transparent. The combining module 24 may combine original image data with image data into combined image data. For example, the combining module 24 combines the image data in the data memory unit 32 with the differential data that is obtained by the differential data obtaining module 23 into the combined image data.

The communicating unit 33 may send the image data to the mobile device(s) 50 via the network 40. The communicating unit 33 may receive the device information 80 of the mobile device(s) 50 via the network 40, and may send the device information 80 to the device information obtaining module 21. The image forming unit 34 may convert the data type(s) of the combined image data to printing process data type(s), such as, for example, CMYK (Cyan, Magenta, Yellow, Black), and may form an image on recording media.

The mobile device 50 may include a CPU 60, a program memory unit 71, a data memory unit 72, a communicating unit 73, input unit(s) 74, and a display unit 75. The CPU 60 controls units and modules in the mobile device 50. The mobile device 50 may include a storage unit 63 which stores, for example, computer program(s) as well as related or other information. The computer program(s) may include a control program to control the mobile device 50. For example, in embodiments where the module 61 is implemented as computer programs, the storage unit 63 may store the module 61 and data used by the module 61. The storage unit 63 may be configured using a hard disk (HDD), a Read Only Memory (ROM), a Random Access Memory (RAM) or an Erasable Programmable Read Only Memory (EEPROM). In other words, any of the operations or functions discussed herein may be implemented on Non-Transitory Computer-Readable Media. The storage unit 63 may include a program memory unit 71 and a data memory unit 72. The program memory unit 71 stores control programs, and the data memory unit 72 stores image data and/or working data. The communicating unit 73 has functional sending and/or receiving data. The input unit(s) 74 may include controller(s). For example, the input unit(s) 74 may include a keyboard and/or a touch panel. The display unit 75 may include a liquid crystal panel.

Other implementations are possible, such as pure hardware implementations (e.g., specialized or application specific integrated circuits configured with logic to perform particular operations), or combinations of hardware and software and/or firmware.

On the other hand, in embodiments where one or more modules, or parts thereof, is/are or include(s) a separate hardware device(s) such as an integrated circuit(s) configured with logic to perform operations of corresponding modules, the storage unit 63 may be internal to one or more of the units 71-72, or may be external to one or more of the units 71-72, and accessed to perform the various operations of the modules. The modules may operate under the control of the CPU 60.

Part of the elements of the mobile device 50 in FIG. 1 may be achieved by a CPU 60 and one or more computer programs in program memory unit 71 that are able to be processed by the CPU 60. The image editing module 61 may have functions of referring to image file in the data memory unit 72 and editing the image file. For example, the image editing module 61 may be executed as a commercially available image editor program, such as, for example, Microsoft Paint®, that are included with Microsoft Windows® software. Also, the image editing module 61 is executed as an image editor program for the mobile device 50.

Processing of the Image Forming System

Figure 3:
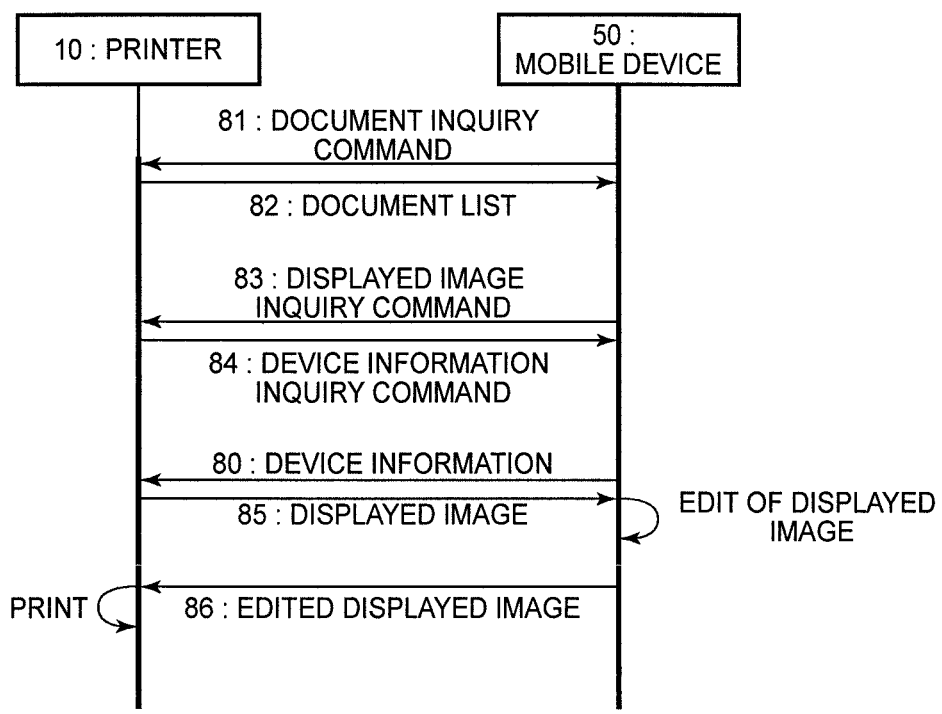
FIG. 3 is a sequence diagram showing data flow between a printer and a mobile device during processes of obtaining a displayed image and printing.

Referring to FIG. 3, at first, the mobile device 50 sends the document inquiry command 81 to the printer 10. Second, the mobile device 50 receives the document list 82 from the printer 10. Third, the mobile device 50 sends the displayed image inquiry command 83 based upon the document list 82. Fourth, when the mobile device 50 receives the device information inquiry command 84 from the printer 10, the mobile device 50 sends the device information 80 to the printer 10. And then, when the mobile device 50 receives the displayed image from the printer 10, the mobile device 50 makes edits to the displayed image and creates the edited displayed image 86, and the mobile device 50 sends the edited displayed image 86 to the printer 10. Lastly, the printer 10 forms an image on paper(s) based upon the edited displayed image 86 that is sent by the mobile device 50.

Processing of Obtaining the Displayed Image

Figure 4:
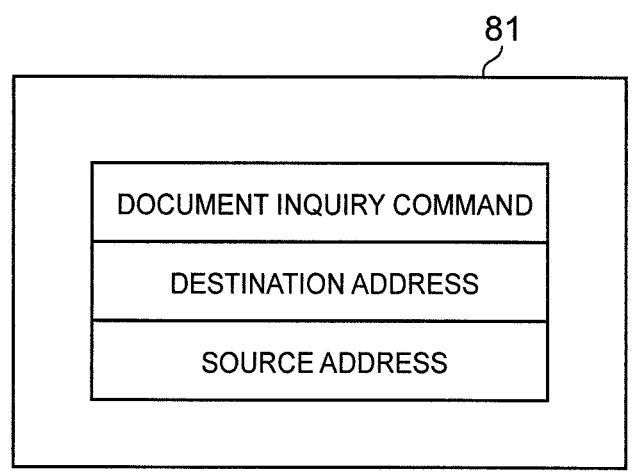
FIG. 4 is a schematic block diagram showing a document inquiry command.
Figure 10A:
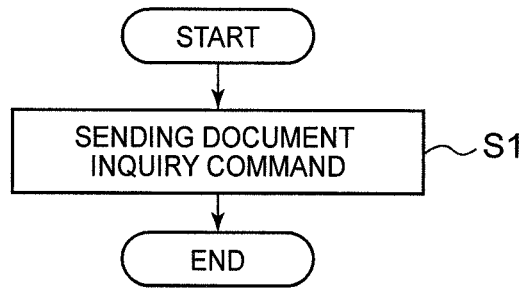
FIG. 10A is a flowchart showing mobile device operation when a process of obtaining displayed image data is executed.

Referring to FIG. 10A, the CPU 60 executes the step 1 (S1) based on execution procedures in the control program. More specifically, the CPU 60 may make the document inquiry command 81. Referring to FIG. 4, the document inquiry command 81 may include the document inquiry command(s), the destination address(es), and the source address(es). The document inquiry command 81 may be sent to the printer 10 under the control of the CPU 60.

Figure 5:
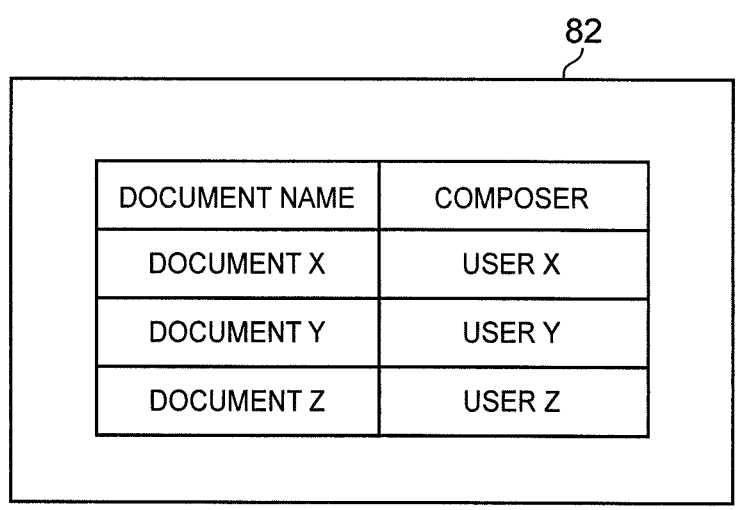
FIG. 5 is a schematic block diagram showing a document list.
Figure 11A:
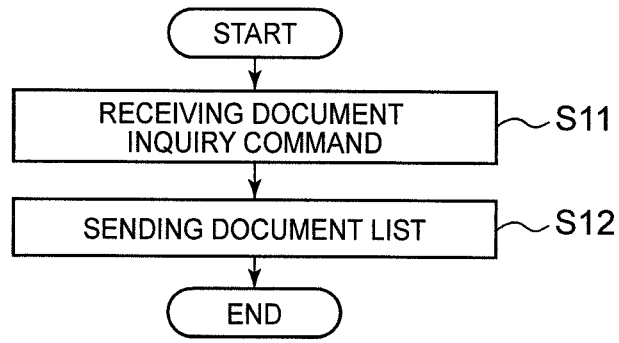
FIG. 11A is a flowchart showing operation in printer when previewing process is executed.

Meanwhile, referring to FIG. 11A, the communicating unit 33 in the printer 10 may receive the document inquiry command 81 under the control of the CPU 20 (S11). The document list 82 may be read out from the data memory unit 32 under the control of the CPU 20, and the document list 82 that is read out may be sent to the source of mobile device 50 via the network 40 (S12). Referring to FIG. 5, the document list 82 includes the document names (e.g., document X, Y, Z, . . . ) and the composers (e.g., User X, Y, Z, . . . ). Also, the document list 82 may include a document name and a composer.

Figure 6:
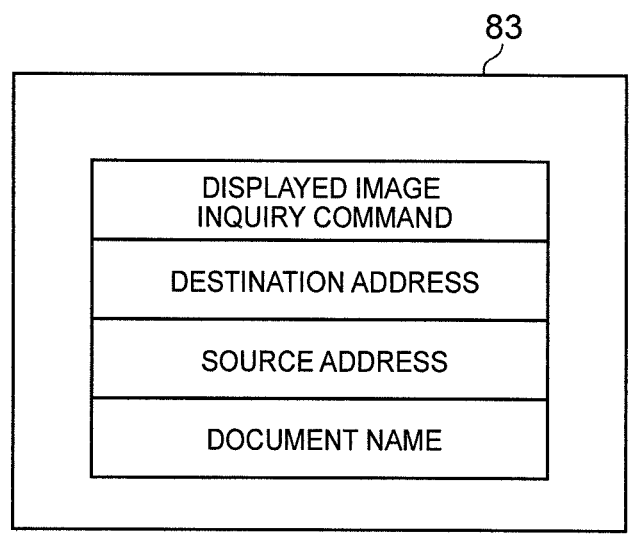
FIG. 6 is a schematic block diagram showing a displayed image inquiry command.
Figure 10B:
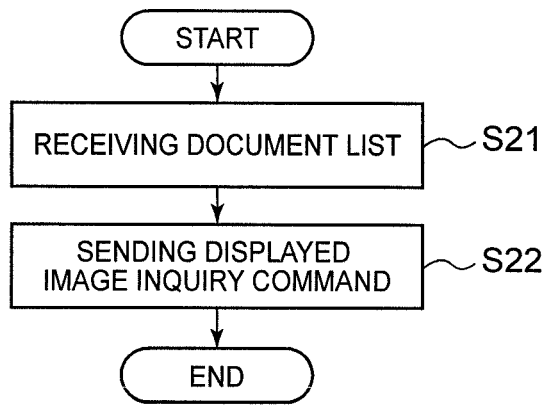
FIG. 10B is a flowchart showing mobile device operation when a process of obtaining displayed image data is executed.

Referring to FIG. 10B, the communicating unit 73 receives the document list 82 from the printer 10 under the control of the CPU 60, and the display unit 75 displays the document list 82 (S21). To obtain the displayed image 85, if the document name may be specified by operating the input unit 74, the CPU 60 makes the displayed image inquiry command 83 (S22). Referring to FIG. 6, the displayed image inquiry command 83 may include the displayed image inquiry command(s), the destination address(es), the source address (es), and the document name(s). The displayed image inquiry command 83 may be sent to the printer 10 under the control of the CPU 60 via the network 40.

Figure 7:
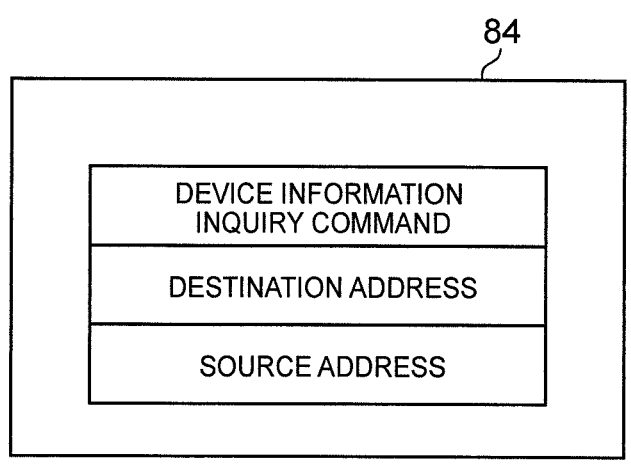
FIG. 7 is a schematic block diagram showing a device information inquiry command.
Figure 11B:
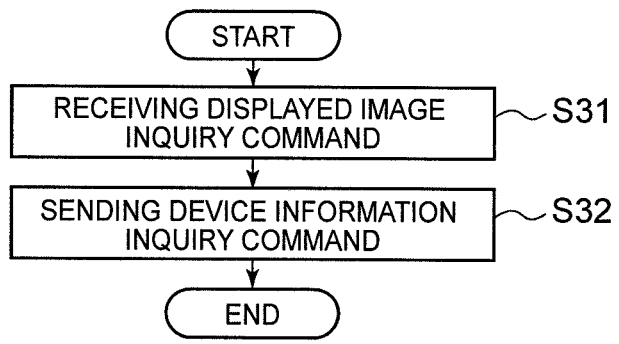
FIG. 11B is a flowchart showing printer operation when a process of obtaining displayed image data is executed.

Referring to FIG. 11B, the communicating unit 33 may receive the displayed image inquiry command 83 under the control of the CPU 20 (S31). The device information inquiry command 84 that the device information obtaining module 21 outputs may be sent to the source of the mobile device 50 via the network 40 (S32). Referring to FIG. 7, the device information inquiry command 84 may include the device information inquiry command(s), the destination address(es), and the source address(es). The device information inquiry command 84 may be sent to the source of the mobile device 50 under the control of the CPU 20 via the network 40.

Figure 10C:
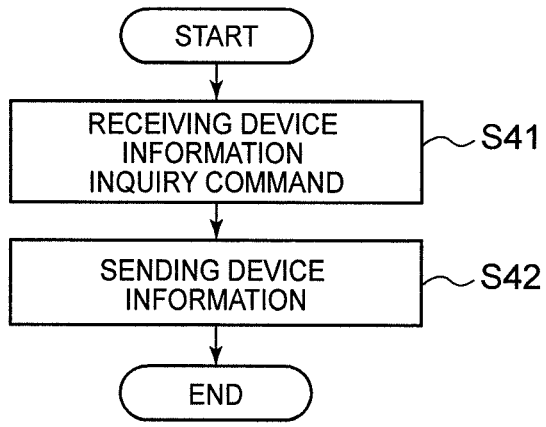
FIG. 10C is a flowchart showing mobile device operation when a process of obtaining displayed image data is executed.

Referring to FIG. 10C, the communicating unit 73 may receive the device information inquiry command 84 under the control of the CPU 60 (S41). The device information 80 in the data memory unit 72 may be read out, and this device information 80 may be sent to the source of the printer 10 via the network 40 (S42).

Figure 8:
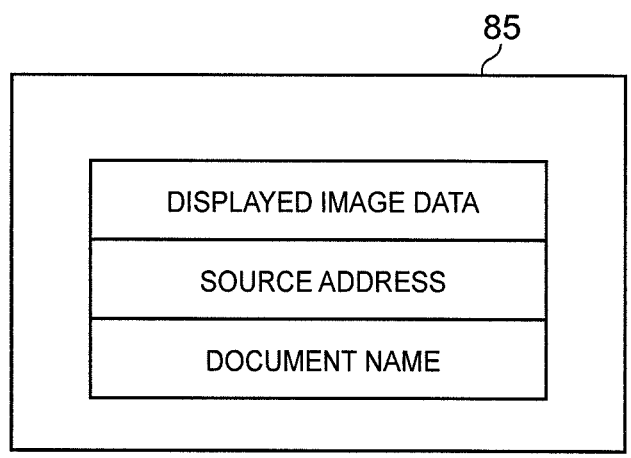
FIG. 8 is a schematic block diagram showing displayed image data.
Figure 11C:
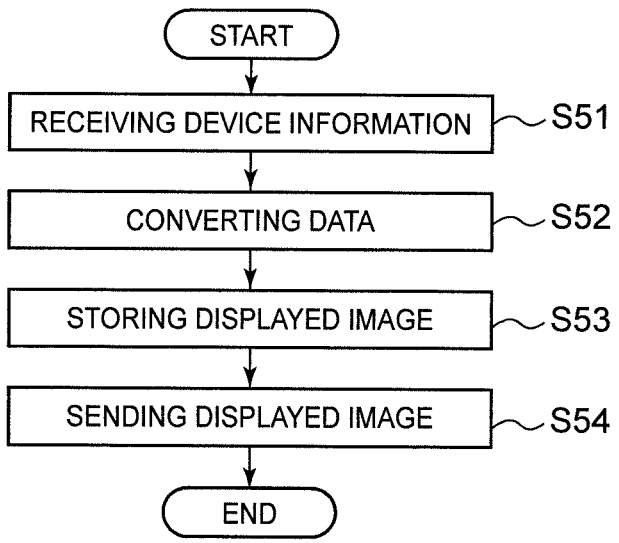
FIG. 11C is a flowchart showing printer operation when a process of obtaining displayed image data is executed.

Referring to FIG. 11C, the communicating unit 33 may receive the device information 80 under the control of the CPU 20 (S51). The data converting module 22 may convert the image data based on the image size, the color resolution, and the type(s) of the image in the device information 80. The converted image data may correspond to the document name(s) in the device information inquiry command 84 (S52). After the converting, the image data is converted to the displayed image 85. The displayed image 85 may be stored in the data memory unit 32 (S53). The displayed image 85 in the data memory unit 32 may be read out, and the displayed image 85 may be sent from the communicating unit 33 to the mobile device 50 via the network 40 (S54). Referring to FIG. 8, the displayed image 85 may include the displayed image data, the source address(es), and the document name(s).

The data converting module 22 in the printer 10 converts the image data based on the device information 80. However, the image forming system described herein is not limited to any particular configuration. For example, the mobile device 50 may include the data converting module 22 instead of the printer 10, and the data converting module 22 in the mobile device 50 may convert the image data based on the device information 80. When the data converting module 22 in the mobile device 50 converts the image data, the image data may need to be sent to the mobile device 50 from the printer 10, but the device information 80 may need not be sent to the printer 10.

Thus, the mobile device 50 may obtain the displayed image 85 of document(s).

Processing of Editing and Printing

Figure 12:
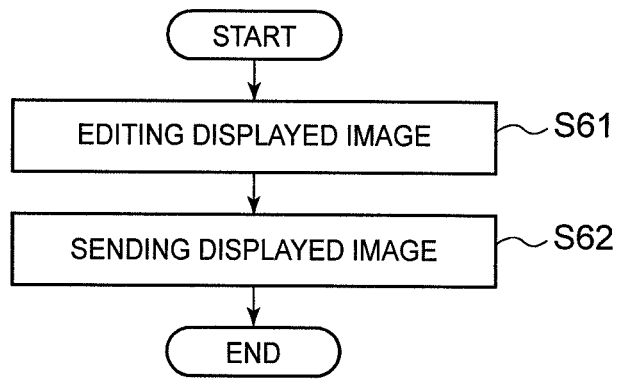
FIG. 12 is a flowchart showing printer operation when a printing process is executed.
Figure 15:
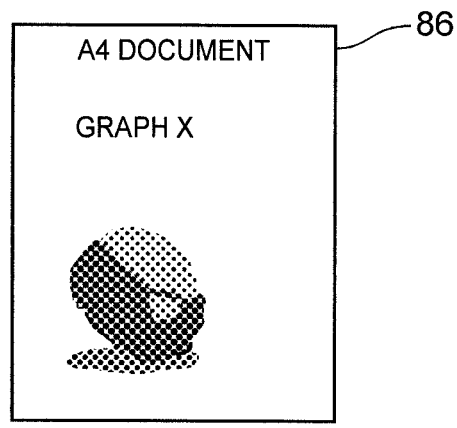
FIG. 15 is an alternate edited version of the displayed image in FIG. 14A.
Figure 16A:
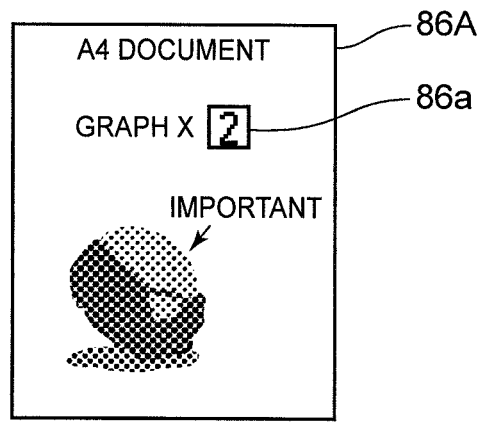
FIG. 16A illustrates an alternate edited version of the displayed image in FIG. 14A.
Figure 16B:
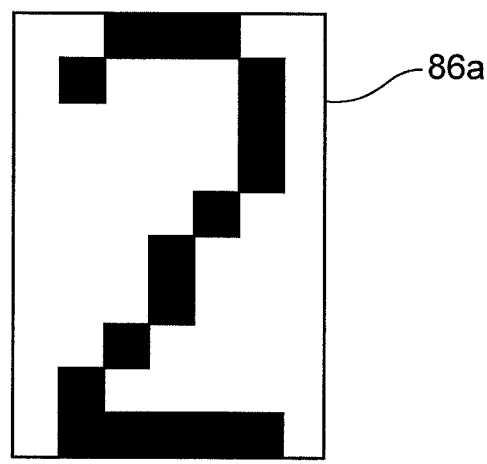
FIG. 16B is an enlarged view of the area 86a in FIG. 16A.

Referring to FIG. 12, the image editing module 61 may edit the displayed image 85 in accordance with the operating of the input unit 74 by a user (S61). If the editing of the displayed image 85 is finished (S61), an edited displayed image 86 may be generated based on the displayed image 85. An exemplary edited displayed image 86 is described in FIGS. 15 to 16B. Referring to FIGS. 14 and 15, as a result of the editing that deletes the descriptions in the area 85a, the edited displayed image 86 is generated. The area 85a is defined by the figure "1" and the rectangle. Actually, in the edited displayed image 86 in FIG. 15, there is no description of the figure "1" and rectangle. Referring to FIG. 16A, as a result of the editing, descriptions are added in the area 86a, and the edited displayed image 86A is generated. The area 86a may be defined by the figure "2", the rectangle, and the word "important." Actually, in the edited displayed image 86, there are descriptions of the figure "2," the rectangle, and the word "important."

Figure 9:
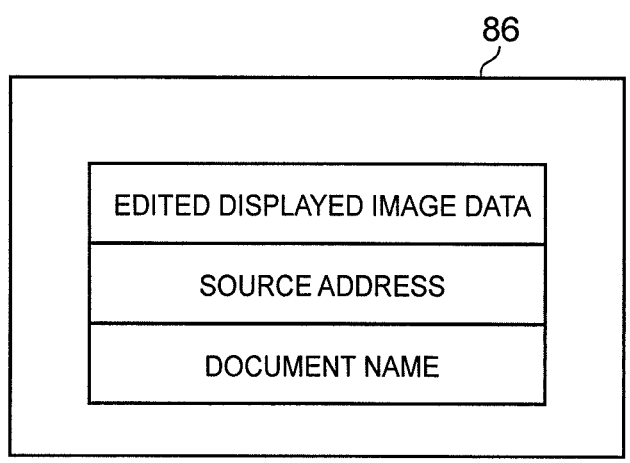
FIG. 9 is a schematic block diagram showing edited displayed image data.

The edited displayed image 86 that is generated at S61 may be sent to the printer 10 from the mobile device 50 under the control of the CPU 60 (S62). Referring to FIG. 9, the edited displayed image 86 may include the edited displayed image data that is edited by the mobile device 50, the source address (es), and the document name(s).

Figure 13:
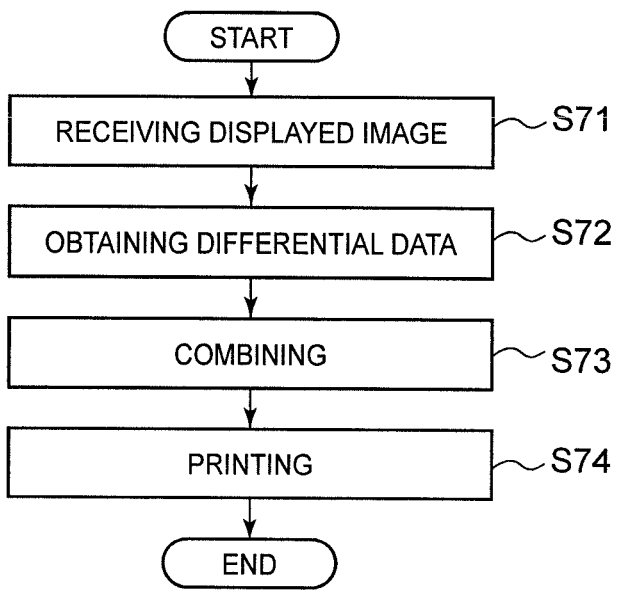
FIG. 13 is a flowchart showing printer operation when a printing process is executed.

Referring to FIG. 13, the communicating unit 33 may receive the edited displayed image 86, and the edited displayed image 86 may be stored in the data memory unit 32 under the control of the CPU 20 (S71). The differential data obtaining module 23 obtains the differential data (S72). The differential data 90 may be generated based on the difference between the edited displayed image 86, 86A and the displayed image 85. The displayed image 85 may be deleted in the data memory unit 32 under the control of the CPU 20.

For example, the process to generate differential data is described below. First, the process is compared to the RGB values of the displayed image 85 and the edited displayed image 86 by each pixel. Second, if there is no difference of the RGB values in a pixel, the RGB values of the pixel may be Alpha=0, Red=0, Green=0, and Blue=0. If there is/are difference(s) in the RGB values in a pixel, the RGB value(s) of the pixel may be set equal to the edited displayed image 86 and Alpha=255.

The reason to set the values to Alpha=255 are described below. The value Alpha=255 indicates that the image is not totally transparent. Also, the Alpha value may be 256 tones. As described above, if there is/are a difference(s) of the RGB values in a pixel, the RGB value(s) of the pixel may be set to Alpha=255. To indicate the existence of edits for the displayed image 85, the RGB values of the edited displayed image 86 need to be adopted.

Figure 17A:
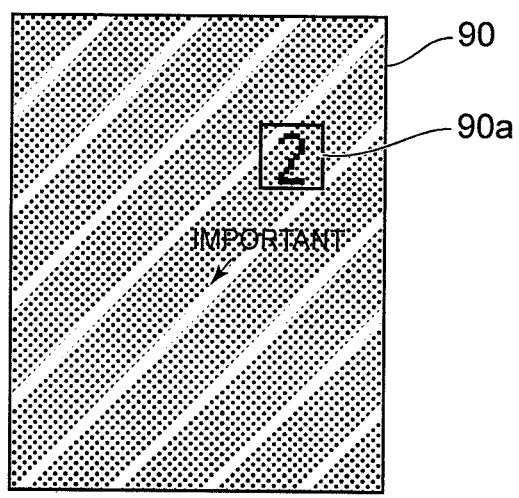
FIG. 17A illustrates differential data that represents the difference between the displayed image in FIG. 14A and the edited displayed image in FIG. 16A.
Figure 17B:
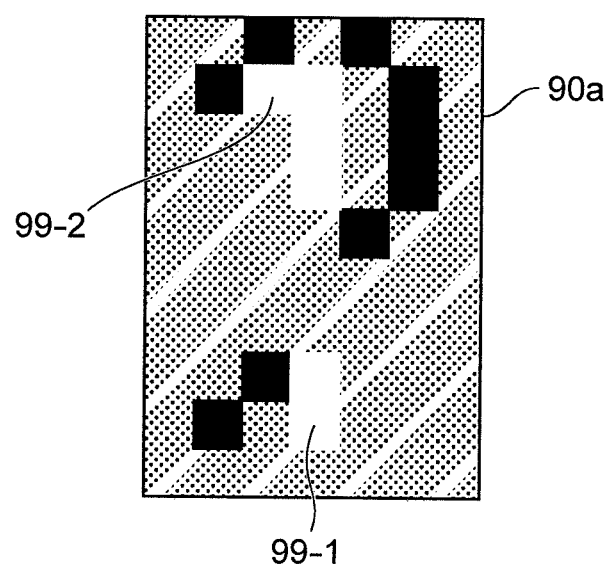
FIG. 17B is a an enlarged view of the part 90a in FIG. 17A.

Referring to FIGS. 17A and 17B, the differential data 90 is described. Also, the areas of the gray diagonal lines in FIGS. 17A and 17B correspond to transparent image portions (Alpha=0). The RGB values of pixels in the gray diagonal lines may be set to Alpha=0, Red=0, Green=0, and Blue=0, and the RGB values of pixels in other image portions, such as, for example, the part 90a, may be set equal to the edited displayed image 86 and Alpha=255. Also, referring to FIG. 17B, white color areas 99 (99-1, 99-2) are part of the number symbol "1" area in FIG. 14B. In the number symbol "1" area, the white color areas 99-1 and 99-2 in the number symbol "1" area and the number symbol "2" area in FIG. 16B do not overlap. As described in the above example, the number symbol "1" area is deleted by the edit, and the number symbol "2" area is added by the edit. Thus, the white color areas 99-1 and 99-2 are a part of the deleted "1" area, which does not need to be printed. The RGB values of pixels in the white color areas 99-1 and 99-2 may be set to Alpha=255, Red=255, Green=255, and Blue=255. However, the RGB values of pixels in the white color areas 99-1 and 99-2 may be set to values in accordance with the color of the recording media. Therefore, areas deleted by the edit do not need to be printed to the recording media.

The differential data obtaining module 23 in the printer 10 obtains the differential data. However, the image forming system described herein is not limited to any particular configuration. For example, the mobile device 50 includes the differential data obtaining module 23 instead of the printer 10. The differential data obtaining module 23 in the mobile device 50 finds the difference(s) between the edited displayed image 86 and the displayed image 85 by each pixel, and may generate the differential data 90 based on the difference(s). When the differential data obtaining module 23 in the mobile device 50 generates the differential data 90, the differential data 90 may need to be sent to the printer 10 from the mobile device 50, but and therefore need not be generated by the printer 10.

Referring to FIG. 13, the combining module 24 may scale the differential data 90 based on the size of the image data, and combine the scaled differential data 90 with the image data. So, the combining module 24 obtains the combined image data (S73).

Based on the combined image, the image forming unit 34 may form an image on recording media (S74).

Thus, the document(s) edited by the mobile device 50 can be printed by the printer 10 as described in the exemplary processing above regarding the data flow between the printer 10 and the mobile device 50 as illustrated in FIG. 3.

More Details of Converting (S52)

For example, an image is A4 size. The size of the image is given by the expressions (1) and (2).

$$297 \text{ mm} * 600 \text{ dpi}/25.4 \tag{1}$$

$$210 \text{ mm} * 600 \text{ dpi}/25.4 \tag{2}$$

The result of calculations based on expression (1) may be 7016 pixels, while the result of calculations based on expression (2) may be 4961 pixels. The value of 25.4 may be used to convert millimeter (mm) to inch, and 1 inch equals 25.4 mm.

As described above, the image data may be converted based on the device information 80. In particular, the image data may be converted based on the vertical pixels and the horizontal pixels included in the device information 80. Also, the image data may be converted based on the aspect ratio. The aspect ratio may be given by the expression (3).

$$\min(480/7016, 320/4961) \tag{3}$$

The result of calculations based on expression (3) may be 6.45%. Thus, the image data may be converted so that the vertical pixels are 453 pixels and the horizontal pixels are 320 pixels. The min (x, y) of the expression (3) means a pixel that is adopted based on the calculations may be less than another between x and y. Also, the converting process (S52) may use the nearest neighbor method as a converting method. The nearest neighbor method adjusts a distance metric locally, so that the resulting neighborhoods stretch out in directions for which the class probabilities do not change much. The nearest neighbor method obtains states of the original pixels and scales them to set output pixels.

After converting the size of the image, the color resolution of the image may be converted. The color resolution of the image may be 24 bits (each RGB pixel is 8 bits), and the color resolution of an image of the mobile device 50 may be 12 bits (each RGB pixel is 4 bits). Therefore, each of the RGB pixels in the image may be converted from 256 tones to 16 tones. Equation (4) describes the converting from 256 tones to 16 tones.

$$\text{(Before converting): Value of Red, Green, or Blue pixel} * 15/255 = \text{(After converting): Value of Red, Green, or Blue pixel} \quad (4)$$

Figure 2:
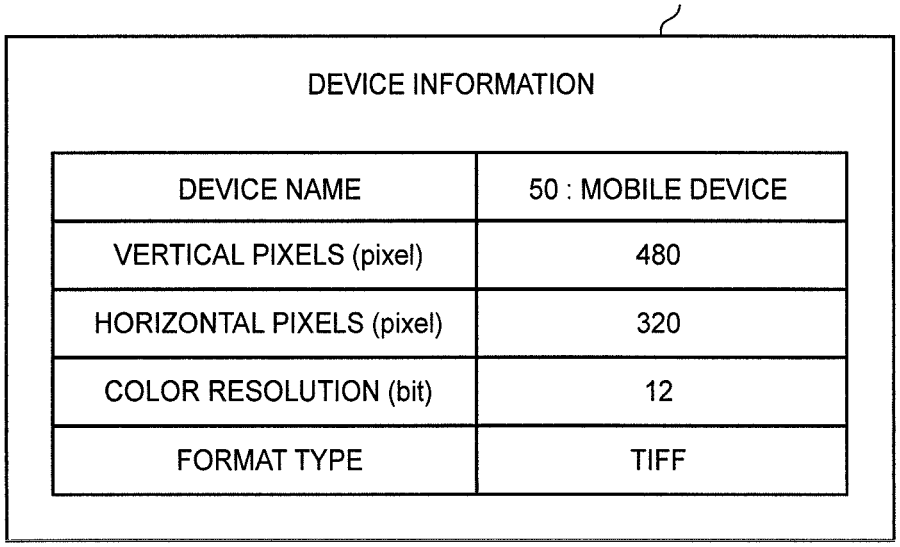
FIG. 2 is a schematic block diagram showing the composition of device information including the image forming system of FIG. 1.

After the converting of the color resolution, the type of the image may be converted to TIFF format as described in FIG. 2. Thus, the displayed image 50 may be generated.

If the displayed image 50 is generated based on the device information 80, which may be processed by the mobile device 50, the mobile device 50 may display the displayed image effectively and quickly, and may start editing the displayed image effectively and quickly.

If the printer 10 fails to obtain the device information 80, the printer 10 may convert an image in accordance with the preliminarily decided aspect ratio, pixels, color resolution, and type of the image.

Additional Details of Combining (S73)

If, for example, the size and color resolution of the differential data 90 are 453 pixels (vertical pixels), 320 pixels (horizontal pixels), and 12 bits, the color resolution of the differential data for each pixel may be converted to 24 bits. The method of converting from 12 bits to 24 bits is given by the equation (5).

$$\text{(Before converting): Value of Red, Green, or Blue pixel} * 255/15 = \text{(After converting): Value of Red, Green, or Blue pixel} \quad (5)$$

After the converting of the color resolution, each of the pixels in the differential data 90 may be scaled in accordance with the size of the image that may be printed. Also, the scaling may utilize the nearest neighbor method. Each of the pixels in the differential data 90 may be combined with each of the pixels of the image data to obtain the combined image data.

In the description of the processing of the image forming system, the nearest neighbor method may be adopted. However, the image forming system described herein is not limited to any particular method. For example, the processing of the image forming system may adopt a bi-linear interpolation method and/or bi-cubic convolution method.

The nearest neighbor method is a method that calculates which pixels before performing the method correspond to pixels after performing the method, and sets the average color value of pixels before performing the method to the color value of pixels after performing the method.

The display unit 75 of the mobile device 50 may display the displayed image as the printing result(s) before the printer 10 prints. Further, the mobile device 50 may edit the displayed image based on user operation(s). Thus, edits for the displayed image are reflected in the image data effectively, the image data is printed easily, and user convenience is improved.

Configuration of the Image Forming System in the Second Embodiment

Figure 18:
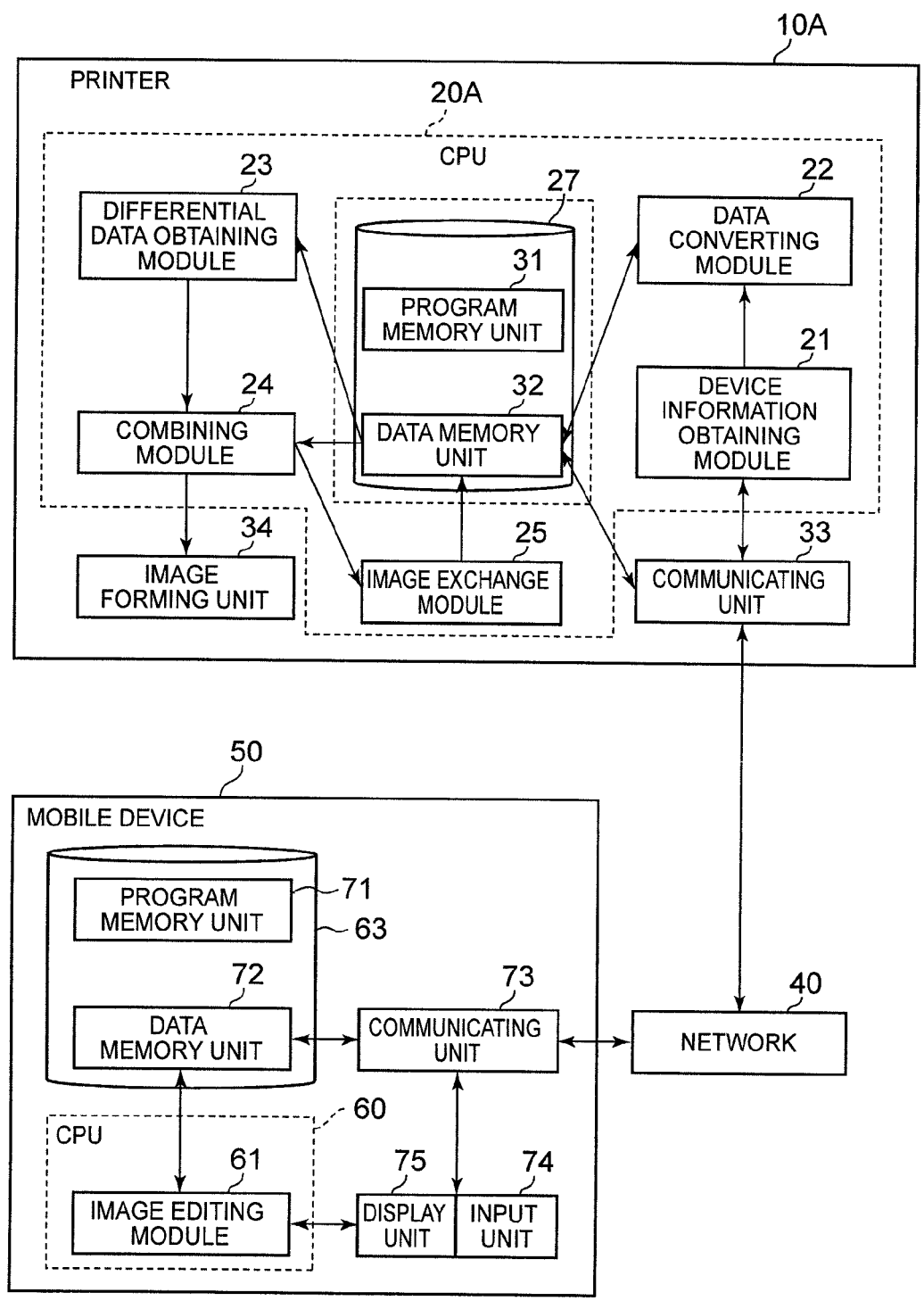
FIG. 18 is a schematic block diagram showing the composition of an image forming system according to a second illustrative embodiment.

The image forming system in FIG. 18 includes a printer 10A and mobile device(s) 50.

The printer 10A may include a CPU 20A, a storage unit 27, a communicating unit 33, and an image forming unit 34. The CPU 20A controls units and modules in the printer 10A. The CPU 20A may execute control programs stored in the program memory unit, and oversee functions of the printer 10A. For example, the CPU 20A may include the device information obtaining module 21, the data converting module 22, the differential data obtaining module 23, the combining module 24, and the image exchange module 25. The image exchange module 25 may exchange the image data that the data memory unit 32 stores for the combined image data that the combining module 24 obtains.

Processing of the Image Forming System

The processing for obtaining the displayed image may have the same processing as the first embodiment. The processing of printing is described below.

Processing of Printing

The processing of printing of the mobile device 50 may be the same as the processing in the first embodiment. The processing of printing for the printer 10A processes is described below.

Figure 19:
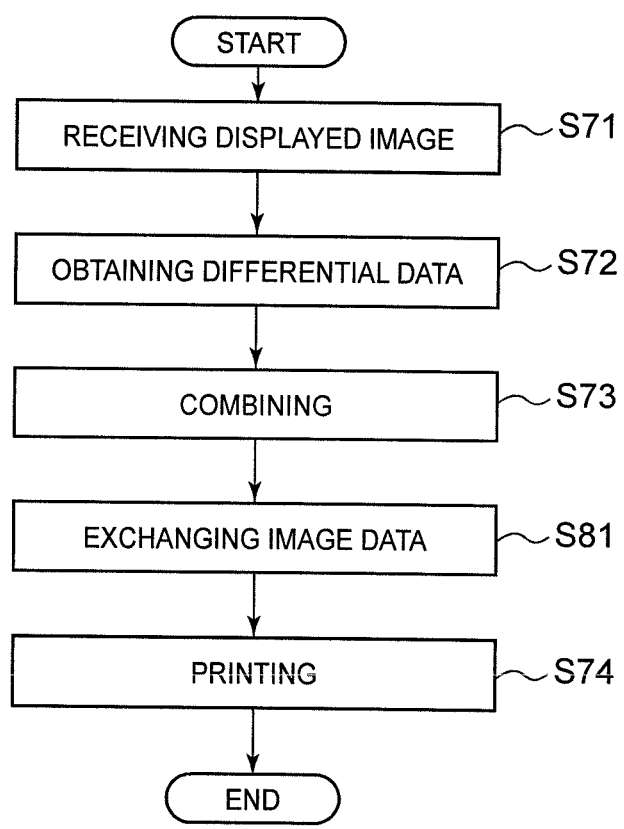
FIG. 19 is a flowchart operation of the printer in FIG. 18 when a printing process is executed.
Figure 20:
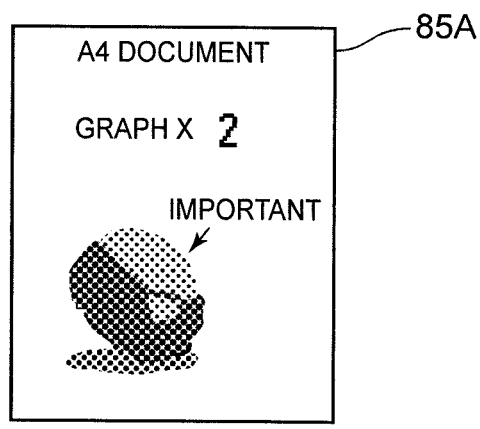
FIG. 20 illustrates a displayed image that is obtained by the mobile device in FIG. 18.

Referring to FIGS. 13 and 19, the processing of printing includes image exchanging (S81) in addition to the processing of printing in the first embodiment.

The communicating unit 33 may receive the edited displayed image 86, and the edited displayed image 86 may be stored in the data memory unit 32 under the control of the CPU 20 (S71). The differential data obtaining module 23 obtains the differential data (S72). The displayed image 85 may be deleted in the data memory unit 32 under the control of the CPU 20.

Next, the combining module 24 may scale the differential data 90 based on the size of the image data, and combine the scaled differential data 90 with the image data. So, the combining module 24 obtains the combined image data (S73). The image exchange module 25 may exchange the image data for the combined image data (S81). Based on the combined image, the image forming unit 34 may form an image on recording media (S74).

In the processing of printing, the combined image data may be stored as the image data in the data memory unit 32. Thus, when the displayed image is obtained in the next time, the displayed image may reflect the result of previous edit. When the image data is printed, the image data may already reflect the result of previous edit.

Figure 14A:
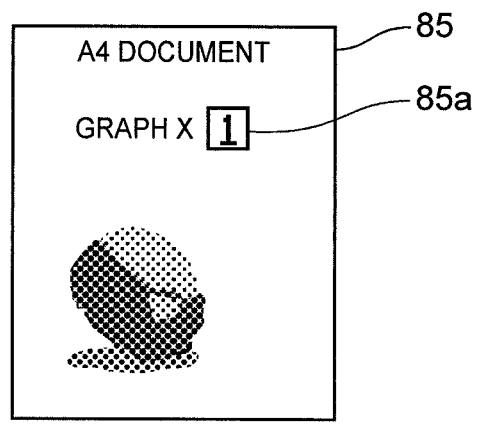
FIG. 14A illustrates displayed image.
Figure 14B:
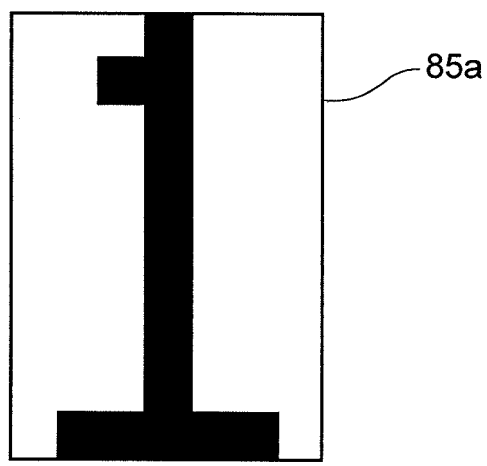
FIG. 14B is an enlarged view of the area 85a in FIG. 14A.
Figure 21:
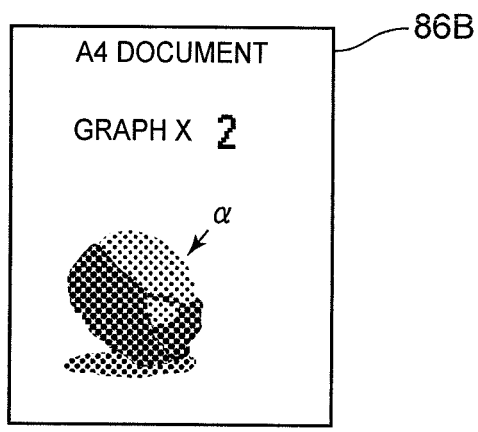
FIG. 21 illustrates an edited version of the displayed image in FIG. 20.
Figure 22:
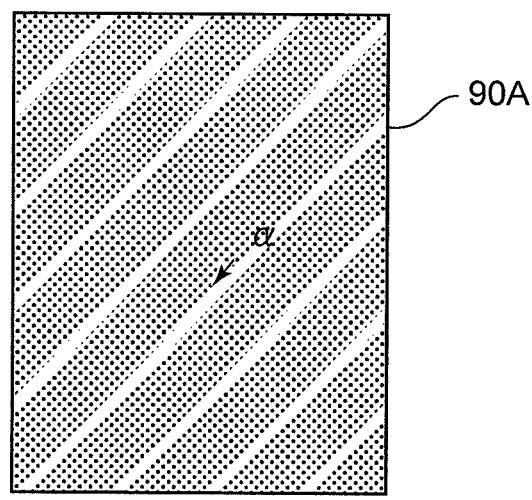
FIG. 22 illustrates differential data that represents the difference from the displayed image and the edited displayed image.

For example, the displayed image 85 in FIG. 14A is edited, and the edited displayed image 86 is printed. So, the combined image data of the image data and the differential data 90 in FIG. 17A is stored in the data memory unit 32 as the image data. The displayed image that the mobile device 50 subsequently obtains may be the displayed image 85A in FIG. 20. The mobile device 50 may externally edit the displayed image 85A. Referring to FIG. 21, the edited displayed image 86B resulting from the edit based on the displayed image 85A is shown. As shown in FIG. 22, the differential data 90A may be converted based on the displayed image 85A and the edited displayed image 86B. Therefore, when the image data is printed, its image may reflect not only present edits to obtain the differential data 90A but also previous edits.

Configuration of the Image Forming System in the Third Embodiment

Figure 23:
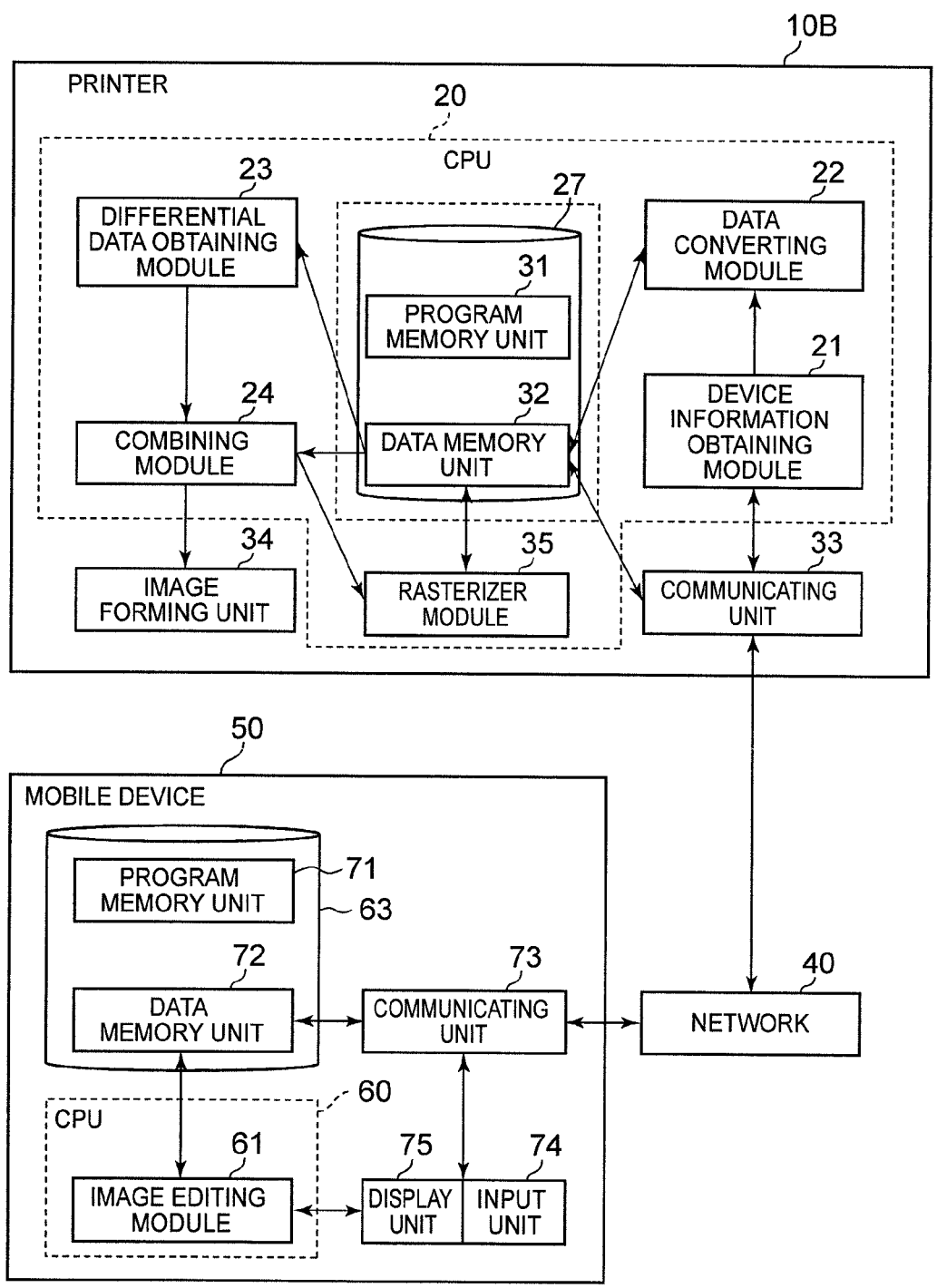
FIG. 23 is a schematic block diagram showing the composition of an image forming system according to a third illustrative embodiment.

The image forming system in FIG. 23 may include a printer 10B and one or more mobile device(s) 50.

Referring to FIG. 23, the printer 10B may include the CPU 20, the storage unit 27, the communicating unit 33, the image forming unit 34, and a rasterizer module 35. The rasterizer module 35 may be connected with the data memory unit 32 in the storage unit 27. The CPU 20 may control the rasterizer module 35, and the rasterizer module 35 may rasterize document(s) data so as to be printed. In other words, the rasterizer module 35 may create the image data from document(s) data.

The mobile device 50 may obtain and edit the displayed image 85 after the rasterizer module 35 rasterizes the document data and the processing of obtaining the displayed image is performed as described above, although document data is not image data.

Configuration of the Image Forming System in the Fourth Embodiment

Figure 24:
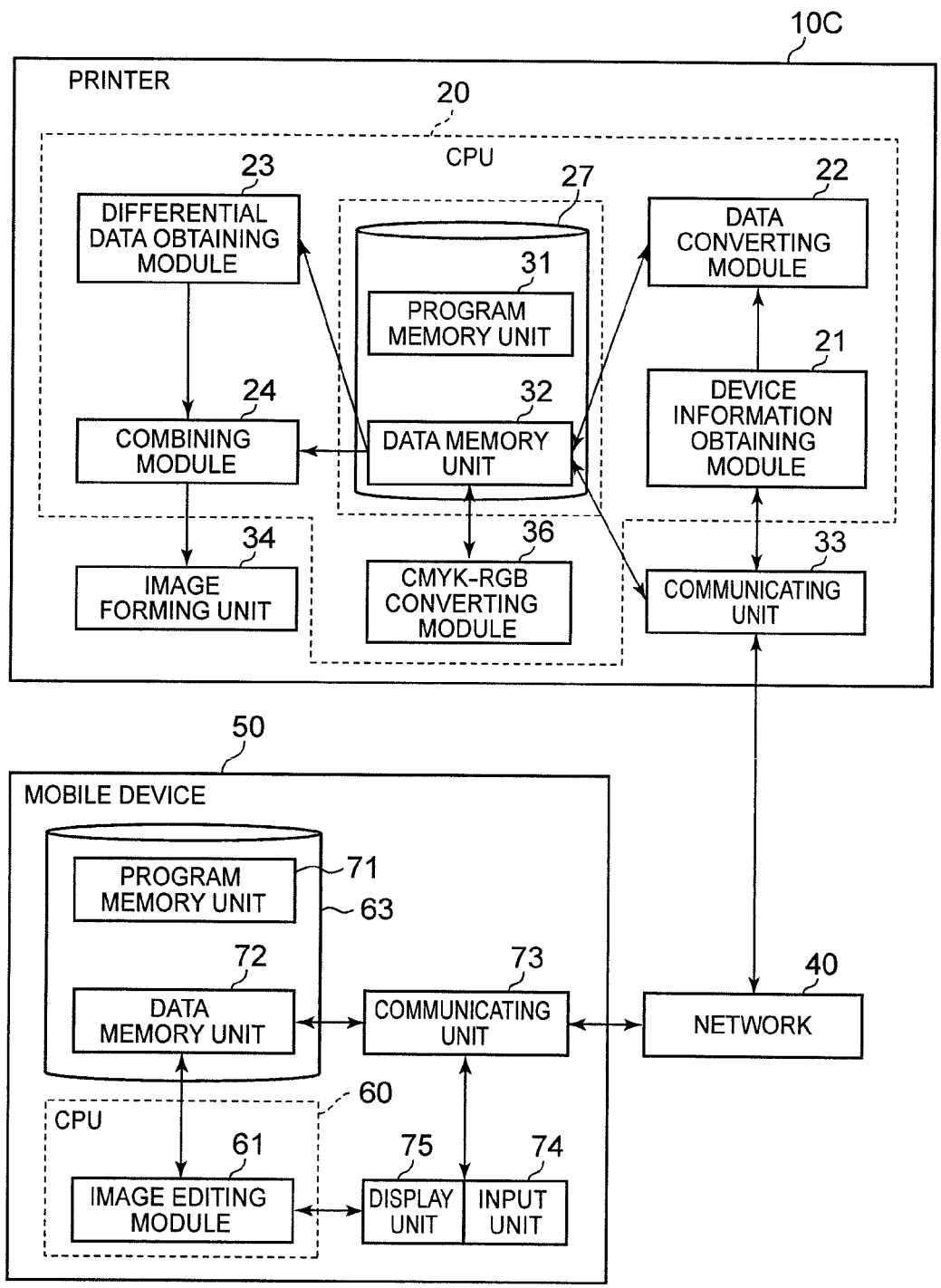
FIG. 24 is a schematic block diagram showing the composition of an image forming system according to a forth illustrative embodiment.

Referring to FIG. 24, the image forming system may include a printer 10C and one or more mobile device(s) 50.

The printer 10C may include the CPU 20, the storage unit 27, the communicating unit 33, the image forming unit 34, and a CMYK-RGB converting module 36. The CMYK-RGB converting module 36 may be connected with the data memory unit 32 in the storage unit 27. The CPU 20 may control the CMYK-RGB converting module 36, and the CMYK-RGB converting module 36 may convert the CMYK format of the image data to the RGB.

The data memory unit 32 stores the image data of CMYK format before the processing of obtaining and editing the displayed image and printing. The CMYK-RGB converting module 36 may convert the CMYK format of the image data to RGB at first, and the processing of obtaining the displayed image is performed as described above. Thus, though the CMYK format of the image data is stored in the data memory unit 32, the edit for the displayed image is reflected in the image data effectively, and the image data is printed easily. For users, the convenience may be improved.

Other Embodiments

The printer 10A may include the rasterizer module 35 and/or the CMYK-RGB converting module 36.

The device information obtaining module 21, the data converting module 22, the differential data obtaining module 23, and the combining module 24 may comprise hardware or combinations of hardware and software separately from the CPU 20 and 20A.

The printer 10, 10A, and 10B, and 10C may be other devices as long as the printer 10, 10A, 10B, and 10C has the function of forming an image. For example, printer 10, 10A, and 10B, and 10C may be a copy device, a fax device, a MFP (Multifunction Printer, Peripheral, or Product). The mobile device(s) 50 may be other devices as long as the mobile device(s) has at least functions of networking capability, displaying a displayed image, and editing.

While the foregoing has particularly shown and described with reference to certain specific embodiments, it will be understood by those skilled in the art that the foregoing and other changes in form and details can be made therein without departing from the spirit and scope of the appended claims.

What is claimed is:

1. An image forming apparatus, comprising:
a data converting module configured to convert image data that is in a first format to displayed image data that is in a second format;
a communicating unit configured to send a displayed image corresponding to the displayed image data via a network,
and to receive via the network an edited displayed image which is edited based on the displayed image, and the edited displayed image is in the second format;
a differential data obtaining module configured to obtain differential data that indicates at least a difference between the displayed image and the edited displayed image, and the differential data is in the second format; and
a combining module configured to convert the second format of the differential data into the first format of converted differential data to adapt a adopt the first format of the image data,
and to combine the image data with the converted differential data into combined image data.

2. The image forming apparatus of claim 1, further comprising:
a device information obtaining module configured to obtain device information via the network; and
the data converting module converts the image data to the displayed image data based on converting conditions included in the device information.

3. The image forming apparatus of claim 2, wherein
the device information is the information processed by a display unit; and
the device information includes at least one of a color resolution, pixels, or a format type of image.

4. The image forming apparatus of claim 3, wherein
the data converting module calculates a proportion of the pixels of the displayed image to the pixels of the image, and converts the image data in accordance with the proportion.

5. The image forming apparatus of claim 4, wherein
the data converting module utilizes at least one of a nearest neighbor method, a bi-linear interpolation method, and a bi-cubic convolution method.

6. The image forming apparatus of claim 2, wherein
the data converting module converts the image data in accordance with preliminarily decided conditions when the device information obtaining module fails to obtain the device information.

7. The image forming apparatus of claim 1, wherein
the combining module converts the differential data in accordance with the pixels, the color resolution, or the format type of image of the device information; and
the combining module combines the image data with the differential data.

8. The image forming apparatus of claim 1, further comprising:
an image exchange module configured to exchange the image data for the combined image data.

9. The image forming apparatus of claim 1, wherein
the image data is rasterized from document data.

10. The image forming apparatus of claim 1, wherein
a format type of the image data is converted from another format type of the image data.

11. The image forming apparatus of claim 1, further comprising:
an image forming unit configured to print based on the combined image data.

12. The image forming apparatus of claim 1, wherein
the differential data has a transparent area that indicates there is no edit to the displayed image data.

13. The image forming apparatus of claim 1, wherein
the differential data obtaining module is further configured to generate the differential data based on at least a difference between the image data and the edited image data.

14. The image forming apparatus of claim 1, wherein
the differential data is RGBA differential data.

15. The image forming apparatus of claim 1, wherein
the displayed image data is deleted after the differential data obtaining module obtains the differential data.

16. An image forming system, comprising:
an image forming apparatus;
at least a mobile device configured an image editing module that edits a displayed image, and;
a network that connects the image forming apparatus and the mobile device;

wherein the image forming apparatus comprises:

a data converting module configured to convert image data that is in a first format to displayed image data that is in a second format;

a communicating unit configured to send a displayed image corresponding to the displayed image data via a network, and to receive via the network an edited displayed image which is edited based on the displayed image, and the edited displayed image is in the second format;

a differential data obtaining module configured to obtain differential data that indicates at least a difference between the displayed image and the edited displayed image, and the differential data is in the second format; and a combining module configured to convert the second format of the differential data into the first format of converted differential data to adopt the first format of the image data, and to combine the image data with the converted differential data into combined image data.

17. The image forming system of claim 13, wherein the differential data is generated by the mobile device.

18. A non-transitory computer readable medium comprising instructions for execution by a control portion of an image forming apparatus, the instructions comprising:

converting image data that is in a first format to displayed image data that is in a second format;

obtaining differential data indicative of at least a difference between the displayed image and edited displayed image that is externally edited based on a displayed image corresponding to the displayed image data, and the edited displayed image is in the second format;

converting the second format of the differential data into the first format of converted differential data to adopt the first format of the image data; and combining the image data with the converted differential data into combined image data.

* * * * *